Oct. 29, 1968  A. C. RECKMAN ETAL  3,407,458
APPARATUS FOR PRODUCING PRE-CAST CONCRETE MEMBERS
INCLUDING REINFORCING ROD HOLDERS PIVOTALLY
MOUNTED ON MOLD BOX
Filed Oct. 23, 1965  8 Sheets-Sheet 1

INVENTORS
Albert C. Reckman
Herman F. Barklage
Theodore M. Ax
BY George T. Shotwell
Wood, Herron and Evans
ATTORNEYS INVENTORS
Albert C. Reckman
Herman F. Barklage
Theodore M. Alt
BY George T. Shotwell
Wood, Herron and Evans
ATTORNEYS

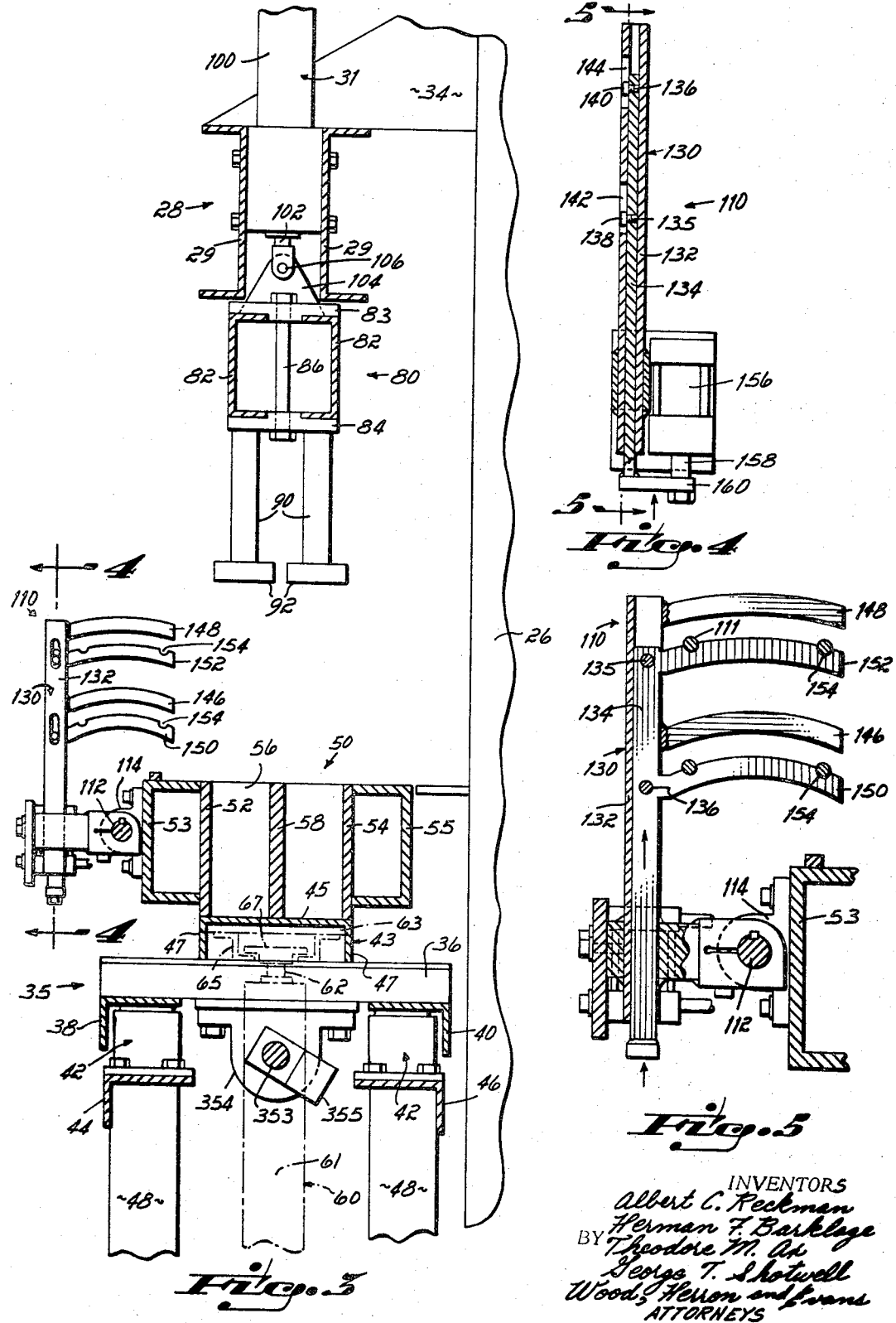

Oct. 29, 1968     A. C. RECKMAN ETAL     3,407,458
APPARATUS FOR PRODUCING PRE-CAST CONCRETE MEMBERS
INCLUDING REINFORCING ROD HOLDERS PIVOTALLY
MOUNTED ON MOLD BOX
Filed Oct. 23, 1965     8 Sheets-Sheet 4
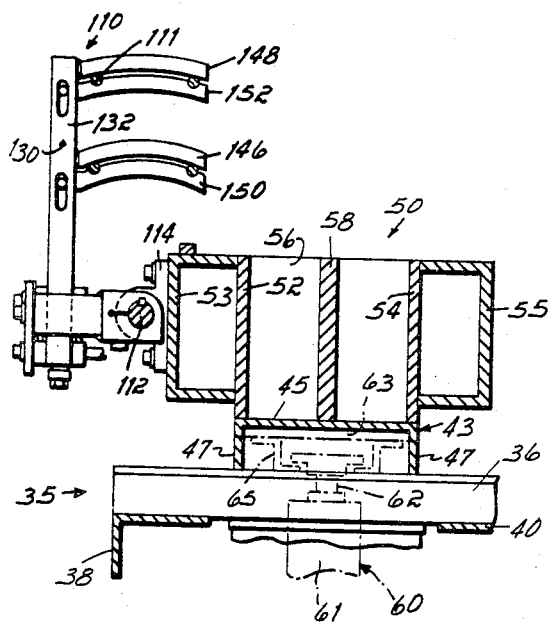
Fig. 6
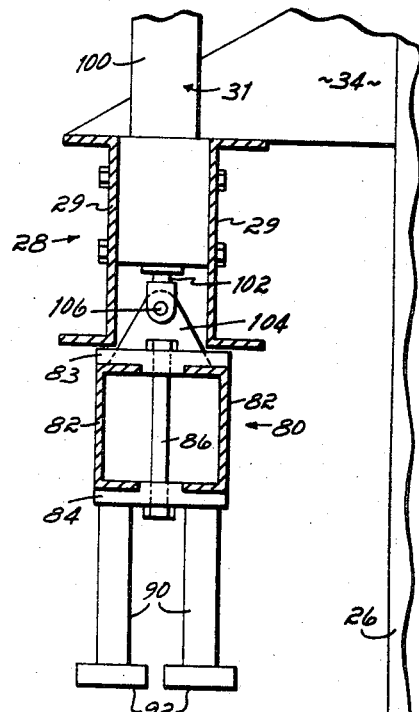
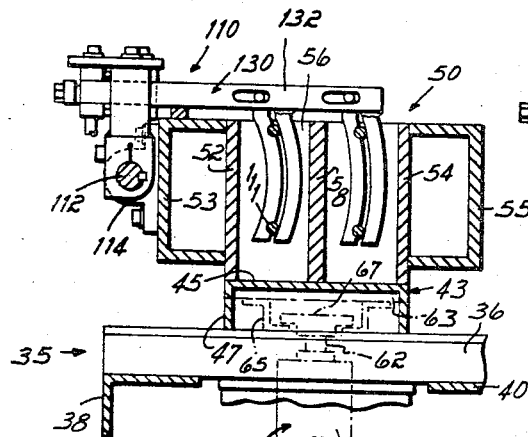
Fig. 7
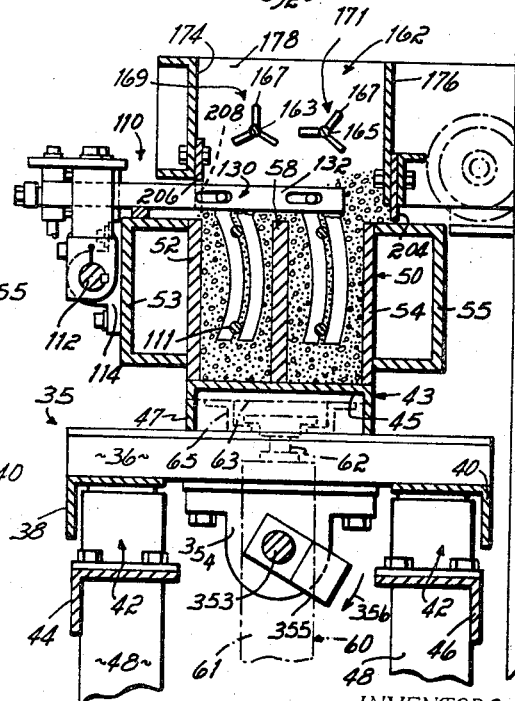
Fig. 8
INVENTORS
Albert C. Reckman
Herman F. Barklage
Theodore M. Ax
George T. Shotwell
BY Wood, Herron and Evans
ATTORNEYS

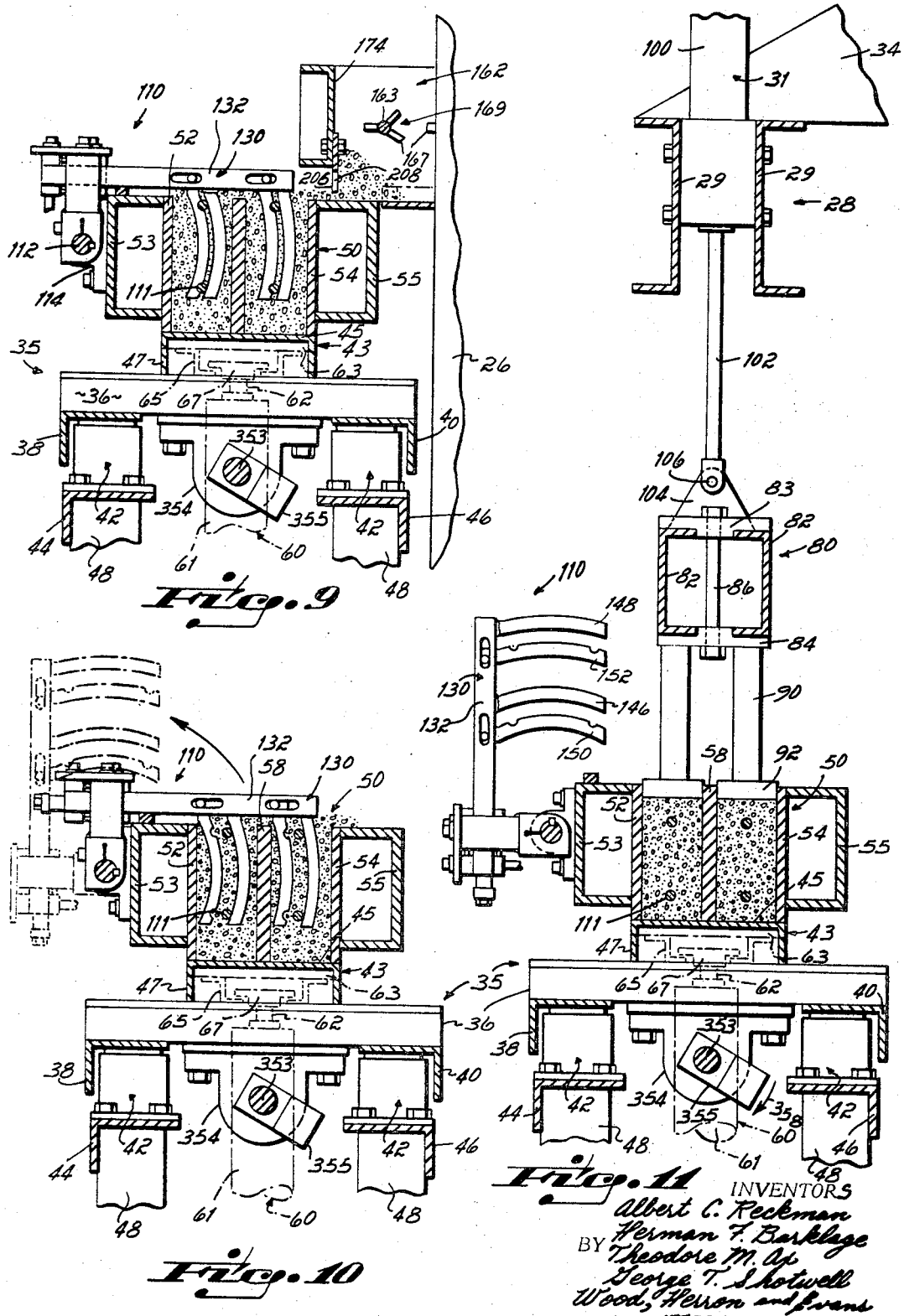

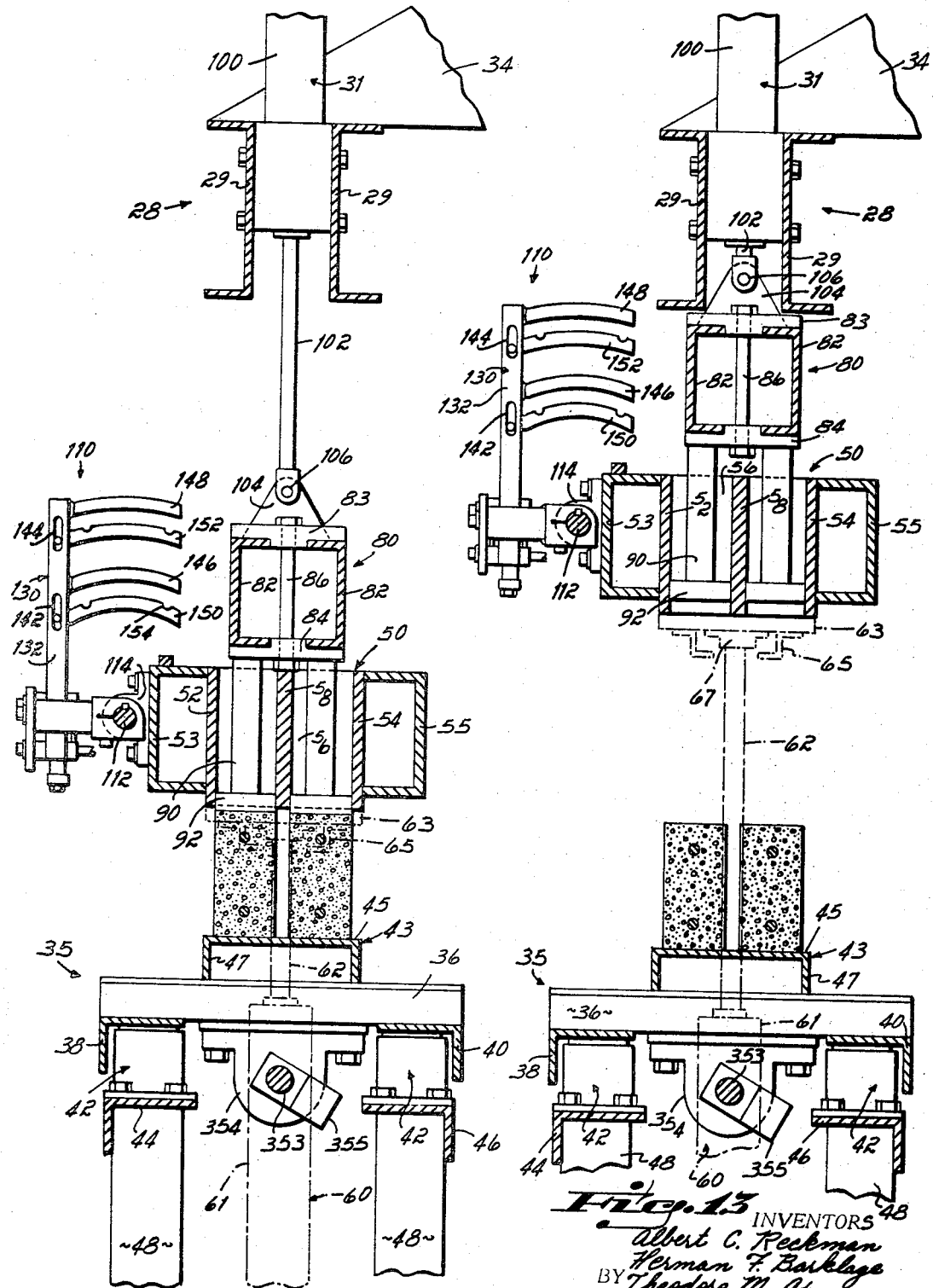

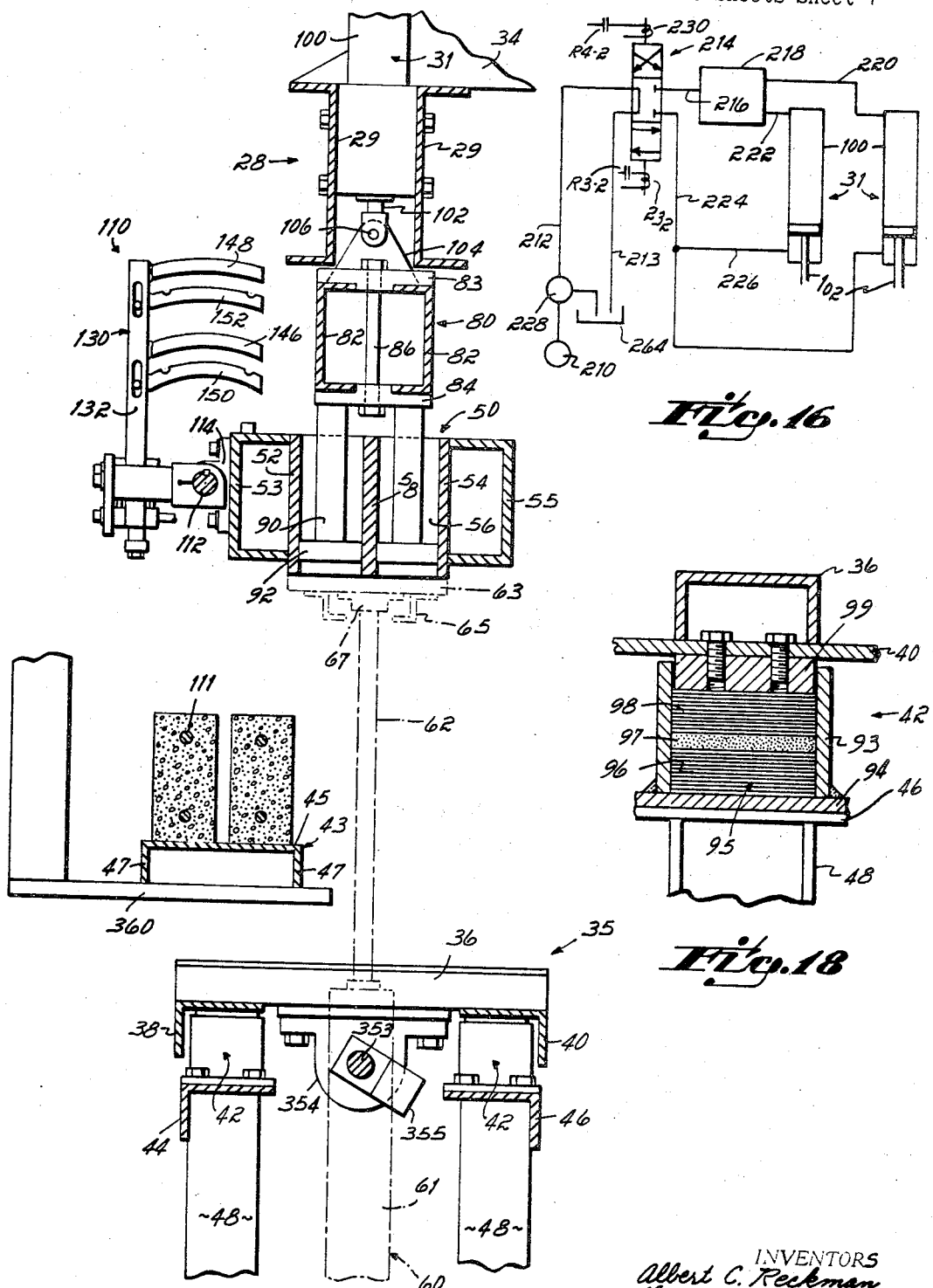

Oct. 29, 1968
A. C. RECKMAN ETAL
3,407,458
APPARATUS FOR PRODUCING PRE-CAST CONCRETE MEMBERS
INCLUDING REINFORCING ROD HOLDERS PIVOTALLY
MOUNTED ON MOLD BOX
Filed Oct. 23, 1965
8 Sheets-Sheet 8
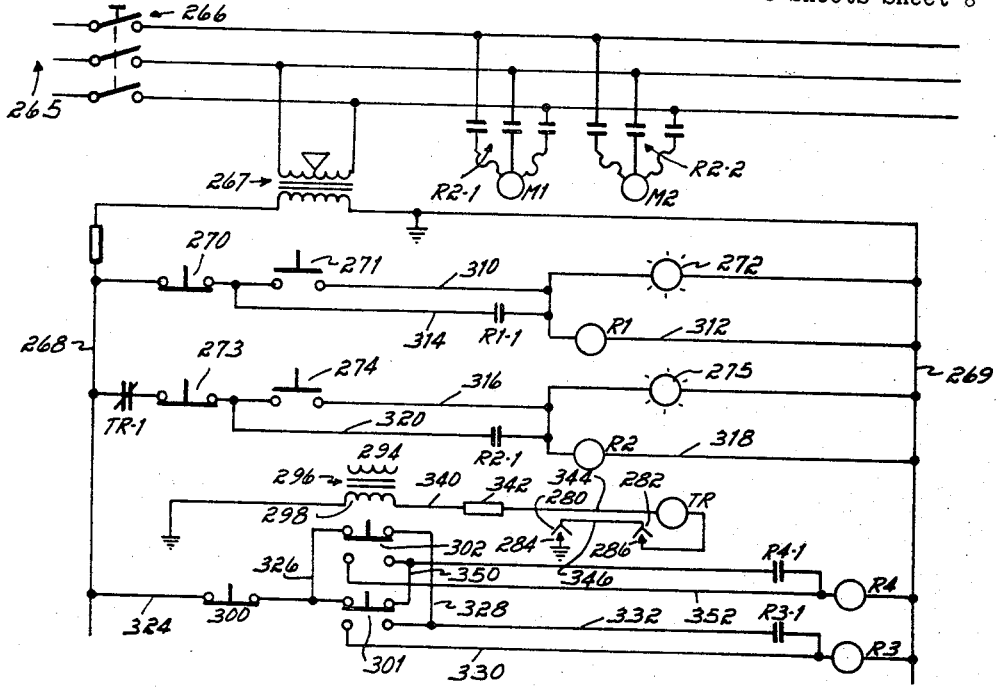
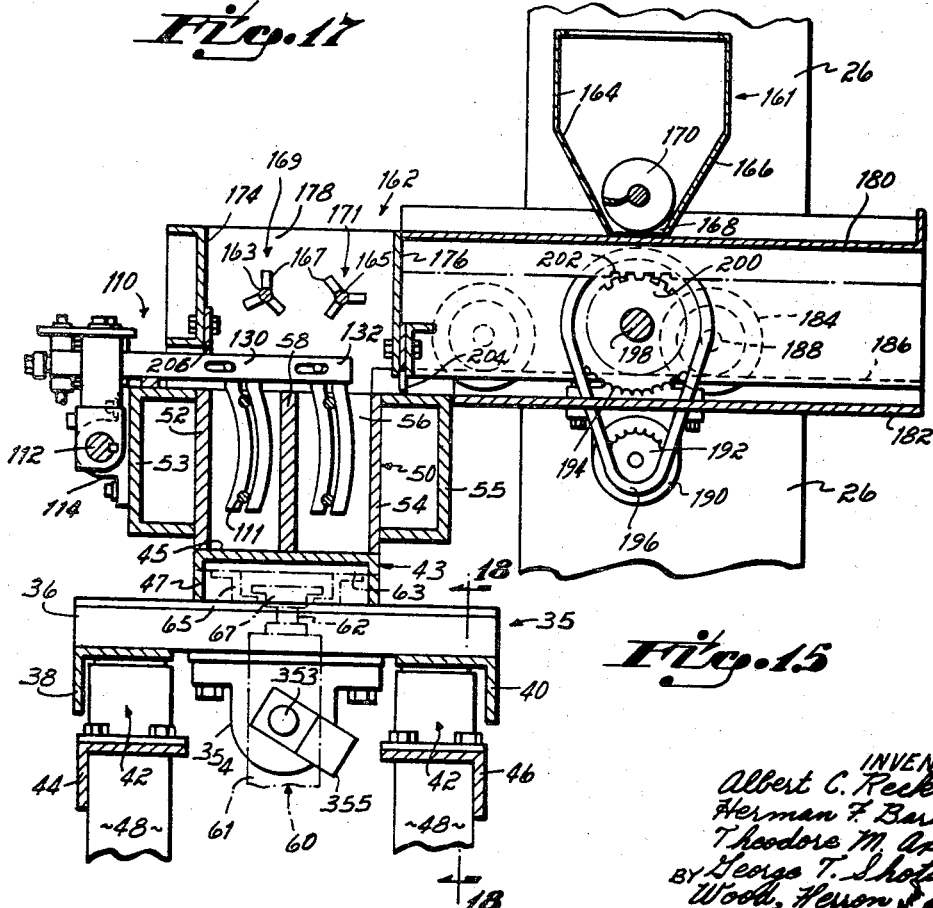
INVENTORS
Albert C. Reckman
Herman F. Barklage
Theodore M. Ax
BY George T. Shotwell
Wood, Herron & Evans
ATTORNEYS

United States Patent Office 3,407,458
Patented Oct. 29, 1968

3,407,458
APPARATUS FOR PRODUCING PRE-CAST CONCRETE MEMBERS INCLUDING REINFORCING ROD HOLDERS PIVOTALLY MOUNTED ON MOLD BOX
Albert C. Reckman, Herman F. Barklage, and Theodore M. Ax, Cincinnati, Ohio, and George T. Shotwell, Covington, Ky., assignors to A. R. Industries, Inc., Cincinnati, Ohio, a corporation of Ohio
Filed Oct. 23, 1965, Ser. No. 503,792
14 Claims. (Cl. 25—41)

ABSTRACT OF THE DISCLOSURE

A machine for forming reinforced pre-cast concrete products by sequentially placing reinforcing rods in a mold box located upon a pallet, filling the mold box with mortar while vibrating the box to compact the mortar around the reinforcing rods, removing the support for the reinforcing rods after the rods are surounded by mortar, sizing the molded product by moving a combination ramming head and stripper plate downwardly into the mold box while the vibration continues, and removing the molded product from the mold box by moving the box vertically upwardly while restraining the ramming head and stripper plate against movement. The machine includes a control circuit for automatically terminating vibrational movement when both ends of the stripper plate are at a predetermined elevation relative to the bottom of the mold. It also includes an improved hydraulic circuit for evenly moving the ends of the ramming head and stripper plate downwardly to compact and size the molded product. To enable the pallet and pallet support to be vibrated relative to the machine frame while simultaneously damping vibration imparted to the frame, the pallet support is mounted upon a unique vibration damping element which consists of a thick lamina of substantially non-metallic, non-compressible, vibration damping material and a relatively thin lamina of compressible, resilient material.

---

This invention relates to the manufacture of pre-cast concrete structures and, more particularly, to an improved apparatus for pre-casting elongated concrete products such as lintels, highway guard rail posts, parking lot bumpers, railroad ties, etc. The term pre-cast as used throughout this application means the opposite of cast in situ. In other words, pre-cast concrete products are finished concrete structures when shipped to a builder or customer rather than being poured in temporary forms at the building site or place of use.

Concrete mix of the type used to form pre-cast concrete structures is a hydrated, loose mixture of coarse aggregates, sand and pulverized Portland cement. The amount of water contained in the mixture is just sufficient to activate the Portland cement and is insufficient to render the mass fluid or flowable as in more conventional concrete pouring operations. Because of the small amount of water contained in the mix, it is extremely quick to "set up" or harden. This extremely quick "set up" time gives rise to one of the primary problems in the manufacture of reinforced pre-cast concrete structures on prior art machines such as disclosed in U.S. Patent No. 2,965,948 of A. C. Reckman et al.

Specifically, reinforced structures, such as lintels, have usually been formed on prior art machines by partially filling the mold box and compacting the mix so as to create a layer of concrete upon which the reinforcing rods are placed and then completely filling the mold box. Unfortunately, the mix sets up so fast that a layer of partially dry mix forms at the interface of the two layers. The result is a stratified product which is weak at the interface.

It has, therefore, been a primary objective of this invention to provide a commercially acceptable machine in which uniform elongated reinforced concrete structures may be made in one charge of the mold box.

Another cause of commercial failure of prior art machines has been an inability to properly size the product and make it of even density from top to bottom or throughout its cross-sectional configuration. Additionally, many prior art machines have been needlessly complex and prohibitively expensive.

Therefore, it has been in objective of this invention to provide an improved commercially acceptable apparatus for pre-casting long narrow reinforced concrete products.

Another objective of this invention has been to provide a machine for producing better sized and more homogeneous reinforced cementitious products than have even been made heretofore.

Still another objective of this invention has been to provide an improved apparatus for delivering concrete mix to the mold box of a pre-casting machine.

Briefly, the machine which accomplishes all of these objectives comprises a vertically movable mold box which is lowered on a pallet located on a vibratable pallet support. Pivotally mounted reinforcing rod supports on the front of the mold box then placed reinforcing rods in the mold box. A feed drawer then moves from beneath a concrete mix hopper to a position over the mold box so as to transport concrete mix from the hopper to the mold box. The pallet support is vibrated as the mold is filled so that the mix compacts around the reinforcing rods. The rod supports are then withdrawn after the feed drawer has moved rearwardly to strike off the top of the mold box. A combination ram and stripper plate is then lowered into the mold as vibration continues so as to evenly compact the concrete product and to size it to a selected vertical dimension. In actuality, compaction and increased density result primarily from the vibration. Ramming functions to even the density while simultaneously sizing the product and finishing the top surface texture. When both ends of the ram have been lowered to a predetermined point, stops are engaged which automatically stop the vibration and thus prevent the production of an undersize product because of extended vibration. While the ram is held in position, the open bottom mold is raised so as to strip the product from the mold. When the ram is subsequently raised, the finished and formed product is left on the pallet. The pallet may then be removed to the curing room, a new pallet inserted into the machine, and the cycle started anew.

The primary advantage of the apparatus heretofore described is that it produces a very homogeneous or monolithic reinforced concrete product which is always of the same size and quality. This consistent sizing and even density is derived from the use of the ram which squeezes or compacts the product during the final portion of the vibrational cycle. While this is not new per se, it is novel in a single charge type of machine which is capable of placing reinforcing rods in the product. Thus the pre-cast product produced by the machine of this invention is a more uniform and standard sized product than has ever heretofore been produced.

Another advantage of this machine is its accuracy in sizing the concrete products. Because the machine is operative to stop vibration automatically when both ends of the ram are at a predetermined height as determined by engagement of the ends of the ram with positive stops, there is no chance or possibility of forming an undersized product because of extended vibration.

Another improvement of this machine over prior art machines is its improved resilient mounting for the pallet support which isolates the support vibrations from the remainder of the machine while retaining a limited amount of resiliency so that the support is free for limited vibrational movement. The pallet support mounting must be sufficiently resilient to permit some vibrational movement of the pallet but it must also be an effective vibration isolation medium operative to preclude transmission of vibration from the pallet support to the machine frame. We have found that the maximum permissible vibrational movement of the pallet support is approximately ⅛ inch. However, a resilient support which sufficiently limits the vibrational movement is usually insufficient to properly isolate the vibration so as to preclude its being transmitted into the machine frame. However, we have also found that when properly mounted, a laminated resilient pad composed of a relatively thin layer of compressible resilient material and a relatively thick layer of substantially non-compressible vibration dampening material makes a very efficient and ideal pad between the vibratable pallet support and the machine frame.

These and other objects and advantages of this invention will be more readily apparent from a description of the drawings in which.

Figure 1:
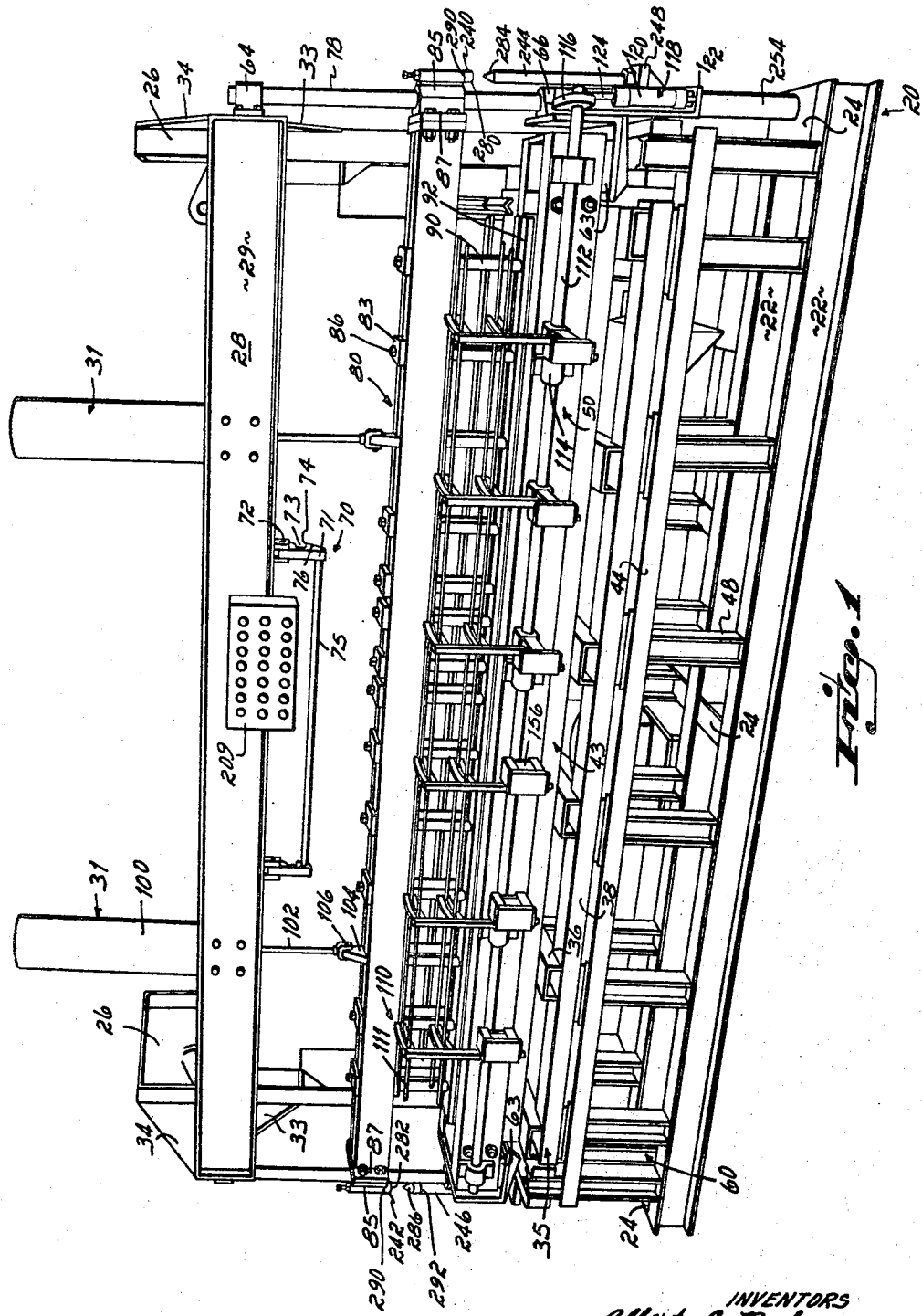
FIGURE 1 is a front perspective view of the machine of this application.

FIGURE 3 is a cross-sectional view of the pallet support, mold box, and ram portion of the machine of FIGURE 1, FIGURE 4 is a cross-sectional view of the reinforcing rod supports taken along line 4—4 of FIGURE 3, FIGURE 5 is a second cross-sectional view of the reinforcing rod supports taken on line 5—5 of FIGURE 4, FIGURE 6 is a cross-sectional view of the pallet support and mold box illustrating how reinforcing rods are clamped within the rod holder, FIGURE 7 is a cross-sectional ivew similar to FIGURE 6 but with the rod holders supporting the reinforcing rods in the mold box, FIGURE 8 is a cross-sectional view, similar to FIGURE 3, illustrating how the mold box is filled by the feed drawer, FIGURE 9 is a cross-sectional view similar to FIGURE 8 illustrating the strike-off of the excess concrete mix from the mold box, FIGURE 10 is a view similar to FIGURE 9 illustrating the reinforcing rod holders open and further showing in phantom the withdrawal of the rod holders, FIGURE 11 is a view similar to FIGURE 3 illustrating the compaction of the mix within the mold box by the combination ram and stripper plate, FIGURE 12 is a view similar to FIGURE 11 illustrating the lifting of the mold box from the finished product, FIGURE 13 is a view similar to FIGURE 12 illustrating the raising of the combination ram and stripper plate from the finished products, FIGURE 14 is a view similar to FIGURE 13 illustrating the withdrawal of the pallet and finished products from the pallet support, FIGURE 15 is a cross-sectional view of the hopper, feed drawer, and mold box with the feed drawer in the forward position, FIGURE 16 is a diagramatic illustration of the hydraulic circuit to the combination ram and stripper plate motors, FIGURE 17 is a diagramatic illustration of the electrical circuit to the pump motor and vibration motor.

FIGURE 18 is a cross-sectional view through one of the vibration isolation pads taken along line 18—18 of FIGURE 15.

MACHINE STRUCTURE

Figure 2:
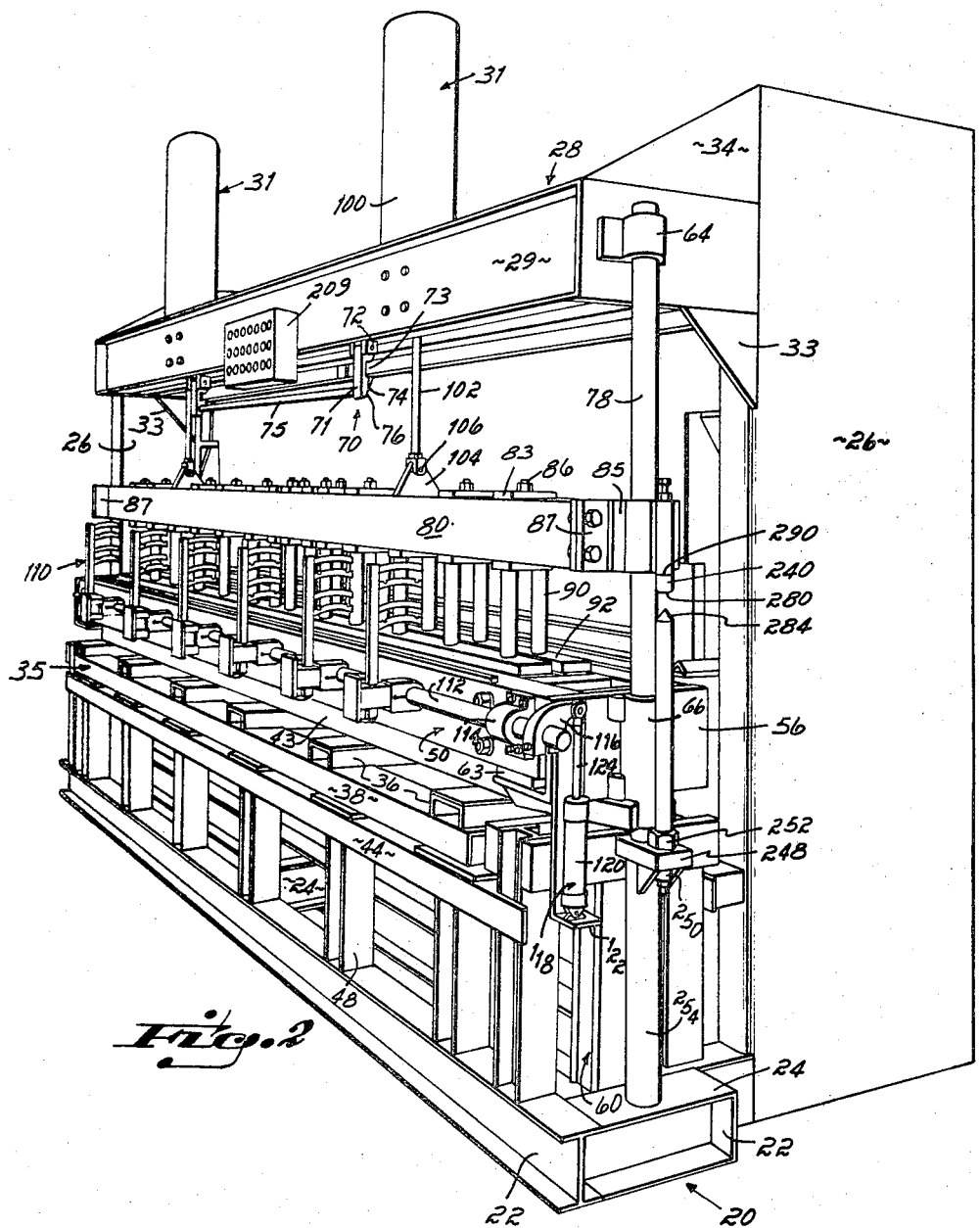
FIGURE 2 is a side perspective view of the machine of FIGURE 1.

With reference to FIGURES 1, 2 and 3, the numeral 20 has been used to designate a base comprising a pair of laterally spaced elongate channels members 22 interconnected by transverse members 24. A pair of laterally spaced, vertical side plates 26 are secured to and carried by member 24. These side plates comprise the vertical frame of the machine, it being noted that the upper ends of the vertical plates 26 are rigidly and permanently interconnected by a horizontal beam assembly 28.

As may be seen most clearly in FIGURE 3, the horizontal beam assembly 28 consists of a pair of spaced channel members 29 between which are clamped ram motors 31. The channels 29 are supported from their lower sides by a pair of corner gusset plates 33 (FIGURE 2) and from the top by gusset plates 34.

A pallet support 35 comprising a plurality of transverse channel members 36 spanningly engages a pair of front and rear angle irons 38 and 40 (see FIGURE 3). The vertical legs of the angle irons 38, 40 enclose resilient pads 42 upon which the angle irons 38, 40 rest. Resilient pads 42 in turn are supported upon front and rear transverse angle irons 44, 46 respectively. The angle irons 44, 46 are welded or bolted to spaced vertical angle irons 48 which are in turn welded to the base channel members 22. Thus, the resiliently mounted pallet support 35 is interposed between a pallet 43 on the pallet support and the base. As a result, the pallet support 35 is mounted for movement relative to the base of the machine in such a manner that any vibration imparted to the support is completely and effectively insulated from the frame.

Vibration of the pallet support 35 is derived from a conventional vibrator 350 mounted on the underside of the pallet support 35. It comprises a central plate 351 welded or otherwise secured to the bottoms of the transverse channel members 36. Upon the bottom of this plate is bolted a series of spaced journal blocks 354 within which a shaft 353 is rotatably mounted. The shaft 353 is driven at a high rotational speed by an electric motor M2 (FIGURE 17) so that eccentric weights 355 secured on the shaft impart a high frequency vibrational movement to the pallet support 35.

The machine frame 20 must be isolated or effectively insulated from the pallet support 35 if the vibration of the pallet support is not to cause wear and ultimate destruction of the machine. However, the resiliency of the isolation medium, the resilient pads 42 must be very limited in order to prevent a pallet 43 mounted upon the pallet support 35 from bouncing on the support with the deleterious result that concrete mix runs or spills from the mold box. Additionally, the resiliency of the pads 42 must be limited in order to prevent the pallet from separating from the mold box during the ramming of the mold box as is explained more fully hereinafter. If the pallet 43 separates from the mold box during ramming, it is difficult or impossible to hold tolerances on the size of the concrete products produced in the mold boxes. Additionally, excessively resilient pads 42 "spring back" upon release of ram pressure so as to force the products from the mold box with the result that the products or units often crack during the "spring back." This is of course intolerable.

The resilient pads 42 which have been found to have the proper vibrational isolation properties together with limited resilience and yet which permit the necessary movement between the elements to which the pads are secured consist of a metal sleeve 93 (FIGURE 18) welded to a base plate 94 which is in turn bolted or otherwise rigidly secured to the angle irons 44 or 46 depending upon whether the pad is located at the front or rear of the machine. Loosely fitted within the sleeve 93 is a resilient and vibration isolation core 95. This core is a laminated product consisting of a bottom layer 96 of "Fabrica," a middle layer 97 of neoprene rubber, and a top layer of "Fabrica" 98.

"Fabrica" is a trade name for a product which consists of layers of tightly twisted cotton duck bonded together and impregnated with a rubber compound. It is sold by the Fabrica Products Company of Boston, Mass.

The "Fabrica" is a very efficient vibration damping medium which for all practical purposes is non-compressible. The neoprene rubber is the resilient portion of the core and therefore is relatively thin in order to restrict the vertical compressibility of the core. Based upon a determination that the vertical deflection of the pallet support 35 should be limited to approximately ⅛ inch, the core 95 should preferably be composed of approximately one inch thick layers 96, 98 of "Fabrica" and a ¼ inch thick layer 97 of neoprene rubber.

To secure the pallet support 35 to the vibration isolation pads 42, spaced metal plugs or plates 99 are bolted or otherwise secured to the bottom of the angle irons 38, 40. These plates fit loosely into the metal sleeves 93 of the pads 42 so that they are free for vertical movement within the sleeves. The combined thickness of each core 95 and metal plug 99 is greater than the height of the metal sleeve 93 so that the bottom of the angle irons 38, 40 never contact the tops of the sleeves 93, even when the cores are fully compressed.

The pallet 43 comprises an elongate channel iron having a flat top plate 45 with depending sides 47. The pallet is adapted to spanningly engage the various channel members 36.

The numeral 50 denotes generally a mold box open at its top and bottom and comprising a rigid, unitary horizontal frame including front, rear and opposed end walls 52, 54 and 56, respectively. If desired, an intermediate member 58 may be provided for longitudinally subdividing the space between the front and rear walls. To further rigidify the mold box, the front and rear walls are preferably reinforced by parallel channel members 53 and 55, respectively.

The mold box is vertically reciprocal between the fully elevated, non-operative positions of FIGURES 13 and 14 to the fully lowered operative position of FIGURES 1 through 11, with the lower face thereof in contacting relationship with the upper surface of pallet 43, thereby defining a concrete receptive chamber open only at its top.

Vertical movement of the mold box 50 is effected by means of a pair of hydraulic motors 60 having cylinders 61 and piston rods 62. This movement is guided by guide bars 78 secured to opposite ends of the machine between the cross beam assembly 28 and the base 20. Brackets 64, secured to the ends of the cross beam 28, support the upper ends of the guide bars 78 while the lower ends of the bars are welded or otherwise rigidly secured to the base 20. Slidably mounted over the guide bars 78 are guide blocks 66 which are bolted to the opposite ends of the mold box 50.

As may be seen most clarly in FIGURES 1, 2 and 3, the hydraulic motors 60 are located at opposite ends of the machine and are supported between the base 20 and the mold box 50. Referring particularly to FIGURES 1 and 2, it will be seen that a bottom plate 63 is secured to opposite ends of the mold box 50 so as to spanningly extend between the front wall 52 and the rear wall 54 of the mold box. Secured to the bottom of each of the plates 63 are a pair of spaced Z-shaped angle irons 65 which enclose a cap 67 of the piston rod 62. When the piston rod 62 and the attached cap 67 are moved upwardly by the hydraulic motors 60, they carry with them the mold box 50. When lowered, the piston rods 62 move the mold box 50 downwardly until its lower surface contacts the upper surface of the pallet 43.

The numeral 80 denotes generally a vertically reciprocable combination ram head and stripper plate assembly which in the preferred embodiment of this invention includes a pair of elongated side channels 82 and top and bottom elements 83, 84 respectively. The top and bottom elements are secured together by bolts 86 so as to sandwich the side channels 82 therebetween in a unitary assembly. The opposite ends of the ram assembly are rigidly secured to end plates 87 which are, in turn, secured and carried by follower elements 85 which slidably engage the vertical guide bars 78. A plurality of depending legs 90 are secured to and carried by the bottom elements 84, the lower ends of the depending elements carrying rigid pads 92 having smooth lower surfaces. If desired, the pads may be secured to elements 90 by means of bolts whereby to permit interchanging the pads, or they may be permanently secured to these elements. The pads are dimensioned to make a loose sliding fit with the pen upper ends of the mold box as hereinafter more fully explained.

Vertical movement of the combination ram head and stripper plate assembly 80 is accomplished by the hydraulic motors 31, each of which comprises a cylinder 100 having a piston rod 102 pivotally secured to a bracket 104 by a bifurcated member 106. The brackets 104 are welded or otherwise secured to the top plate element 83 of the ram assembly 80.

Thus, vertical movement of the piston rod 102 controls vertical displacement of the combination ram head and stripper plate assembly 80 so as to move the assembly 80 from the raised position of FIGURE 3 to the lower position of FIGURES 11 and 12.

A safety latch 70 is preferably provided for precluding the accidental or unintentional lowering of the ram head and stripper plate assembly. As may be seen in FIGURES 1 and 2, this latch comprises a pair of levers 71 pivotally depending as at 72 from the cross beam assembly 28 of the frame. The lower ends of these levers 71 are notched so as to define a generally hook shaped end 73 which provides a bearing surface 74 engageable under the front channel 82 of the ram assembly 80. The levers 71 are interconnected by an actuator bar 75 which may be grasped by an operator for effecting disengagement of the latch from the ram head and stripper plate assembly. The bottom of levers 71 are inclined as at 76 to provide a surface which will be automatically swung out of interfering reationship with the ram-stripper assembly incident to movement of the assembly to its fully elevated position. The latch lever 71 automatically seeks the latching position after the ram-stripper assembly has been raised into its fully elevated position as a result of gravity forcing the latch lever into the hooking or latching position of FIGURES 1 and 2 under the ram-stripper assembly.

The machine of this invention incudes a reinforcing rod placement assembly indicated generally by the numeral 110. The assembly is mounted on the front of the mold box 50 so as to be vertically movable with the mold box. It includes a main shaft 112 supported within journal blocks 114 bolted to the front channel 53 of the mold box. Rotational displacement of the main shaft 112 through an angular arc of approximately 90° is controlled by a crank arm 116 non-rotatably keyed to one end of the shaft 112 (see FIGURE 2). Movement of the crank arm 116 is in turn controlled by a hydraulic motor 118. This motor 118 includes a cylinder 120 pivotally connected at its lower end to a generally L-shaped frame member 122 which depends from and is welded to the side plate 56 of the mold box 50. The piston 124 of motor 118 is pivotally secured at its end to the free end of crank arm 116. As shown in FIGURE 2, the crank arm is in its raised position with the piston rod 124 extended and the reinforcing rod support 110 in its raised position. When the piston rod is pulled downwardly to its lower limit, the bell crank 116 rotates through approximately 90° and thus rotates shaft 112 through a similar arc.

As may be seen more clearly in FIGURE 1, six support blocks 130 are equally spaced aong main shaft 112.

These blocks are non-rotatably keyed to the shaft so that rotation of the shaft results in rotation of the blocks.

Referring to FIGURES 3, 4 and 5, it will be seen that each of the blocks 130 supports a channel shaped arm 132 within which an actuating member 134 is longitudinally slidable. To prevent the actuating member 134 from inadvertently moving out of the channel of arm 132, a pair of bolts 135, 136 extend from the arms and have heads 138, 140, respectively, slidable within slots 142, 144 of the arm 132.

As may be seen most clearly in FIGURE 5, spaced parallel fingers 146, 148 extend outwardly toward the mold box from the arm 132. These fingers are generally arcuate in configuration and have a radius equal in length to the distance from the center of main shaft 112 to the fingers 146 and 148. Similarly, the actuating member 134 includes a pair of parallel fingers 150, 152 cooperable with the fingers 146 and 148, respectively, of the arm 132 to clamp reinforcing rods 111 therebetween. To receive the reinforcing rods 111 and prevent their inadvertent movement once they are placed between the fingers and until the fingers are closed, each of the radial fingers 150, 152 includes a pair of spaced notches 154 in its upper surface.

Vertical displacement of each of the actuating members 134 is controlled by a hydraulic motor 156 mounted upon the support blocks 130. The depending piston rod 158 of this motor 156 is attached by a link 160 to the bottom of the actuating member 134 so that vertical displacement of the piston rod 158 results in parallel movement of the actuating member 134.

Referring to FIGURE 15, there is illustrated the hopper 161 and feed drawer 162 for storing and transporting concrete mix to the mold box 50. The hopper 161 includes a sloping inwardly inclined front wall 164 and an inwardly inclined rear wall 166 which extend between the side frame members 26 of the machine frame. The hopper 161 has an open top through which concrete mix is poured into the hopper and an open bottom 168 through which mix is deposited into the feed drawer 162. A motor driven feed screw 170 is preferably located in the bottom of hopper 161 to distribute concrete mix throughout the length of the hopper.

The feed drawer 162 is movable from a position beneath the hopper 161 to a position over the mold box 50 so as to transport a charge of concrete mix therebetween. It includes a channel shaped front wall 174 and rear wall 176 and side walls 178 located at both ends of the feed drawer. An apron 180 extends rearwardly from the top of the rear wall 176 between the two end walls 178 of the feed drawer. This apron functions as a hopper closure upon forward movement of the feed drawer from beneath the hopper 161.

To preclude concrete mix from falling through the open feed drawer 162 after the feed drawer is filled but before it is located over the mold box 50, a horizontal apron plate 182 is welded or otherwise secured to and between the side frame members 26.

For purposes of permitting forward and rearward movement of the feed drawer, rollers 184 are journalled upon stub shafts 188 in the side plates 178 of the feed drawer. These rollers are movable over spaced channels 186 rigidly attached to the top surface of the apron 182.

A rotary hydraulic motor 190 is mounted beneath and supported from the frame apron 182. This motor is operative to drive a feed drawer drive shaft 198 through a conventional chain 196 and sprocket 192, 194 drive. Pinions 200 located at opposite ends of the shaft 198 mesh with teeth of a rack 202 attached to the bottom of the feed drawer apron 180. Thus, through the chain and sprocket drive and rack and pinion drive, rotary movement of the hydraulic motor 190 is operative to move the feed drawer forwardly from a position beneath the hopper to a position over the mold box 50. After the mold box has been charged with the concrete mix from the feed drawer, the drawer may be moved rearwardly by the motor to locate it beneath the hopper 161.

In moving forward, the rear wall 176 and an attached depending heavy rubber flap 204 push the concrete mix contained within the drawer forwardly over the apron 182. The bottom of the hopper 161 is then closed by the apron 180 so that no mix spills from the hopper. Upon rearward movement of the drawer, the forward wall 174 and particularly the attached depending strike off plate 206 is operative to strike off any excess concrete mix from the top of the mold box. As may be seen most clearly in FIGURES 8 and 15, the depending strike off plate 206 includes slots 208 which slide over the arms 132 of the reinforcing rods supports, the fingers of which are located in the mold box at the time the mold box is charged with concrete mix.

In order to assist the filling of the mold box with concrete mix, the feed drawer 162 is provided with a pair of combination agitator and distributor assemblies 169, 171. Each of these assemblies 169, 171 includes a shaft 163, 165 which extends the full length of the feed drawer and is journalled in the feed drawer end plates 178. Extending radially from each of these shafts 163, 165 is a plurality of spaced paddles or agitators 167 which function to distribute the concrete mix throughout the width of the mold box as well as to agitate the mix so that it falls freely from the drawer 162 into the mold box 50. Preferably the blades or paddles 167 are set at an angle of approximately 40° relative to the axis of the shafts 163, 165 so that the paddles function in the fashion of a feed screw to distribute the concrete mix away from the center of the feed drawer and toward the ends.

The shafts 163, 165 are driven in rotation from an independant motor (not shown) mounted upon the feed drawer. The motor may be either manually controlled or automatically cycled during the forward movement of the feed drawer.

The control system for operating the electrical-hydraulic systems of this machine are preferably controlled from an electrical control panel 209 mounted upon the front of the cross beam assembly 28. It may, however, be controlled from a conventional automatic programming medium such as a cam shaft. The majority of this control system is conventional and may be easily supplied by those skilled in this art. However, that portion of the control system which controls the ram-stripper feed motors 31 is unique and has therefore been illustrated and described herein. The hydraulic system is illustrated in FIGURE 16 and the electric control system is shown in FIGURE 17.

Referring first to FIGURE 16, it will be seen that the ram control hydraulic motors 31 are supplied with fluid from an electric motor driven pump 210. This pump supplies fluid to the motors 31 via conduits 212, 213 through a solenoid operated directional valve 214. Fluid to or from the upper ends of the ram-stripper assembly motors 31 passes through a flow equalizer 218 which functions to insure that equal amounts of fluid are supplied through conduits 220, 222 to the top sides of each of the ram motors 31.

The flow equalizer is preferably a geared type metering device having a pair of gear rotors mounted upon a common shaft such that both gears pass an equal amount of fluid during each rotation of the shaft. One commercially available equalizer which has been found to be suitable is a "Gerotor" Flow Divider manufactured by the Double A Products Company of Manchester, Michigan, a subsidiary of Brown and Sharpe Manufacturing Company. The lower ends of the fluid motors 31 are connected by conduits 224, 226 to another portion of the solenoid valve 214. It will be noted that the conduit 212 includes a pressure release valve 228.

In operation, the pump 210 is operative to supply fluid to the valve 214. If neither solenoid 230 or 232 of the valve 214 is energized, the valve is in a neutral position in which no fluid is supplied to either of the valve outlet conduits 216 or 224. If the solenoid 232 is energized, the valve is operative to supply fluid to the conduit 216 and thus to the equalizer 218 and the upper ends of the fluid motors 31. At this time, fluid is exhausted from the motors 31 through the conduits 224, 226 and the valve ports to tank. When the ram-stripper assembly 80 reaches its downward limit of movement, stops 240, 242 (FIGURES 1 and 2) attached to opposite ends of the ram engage positive stops 244, 246 of the frame. The stops 244, 246 are adjustably attached to laterally extending brackets 248 by adjusting nuts 250, 252. The brackets 248 are in turn welded to sleeves 254 which fit over guide bars 78 and are immovably welded to the base 20. When the stripper-ram assembly stops 240, 242 engage the frame assembly stops 244, 246, fluid flow from the pump 210 is bypassed through the pressure release valve 228 to tank 264. However, the pump continues to operate so long as the electric motor driving the pump operates. To lift the ram, fluid is supplied to the lower ends of the fluid motors 31 from the valve 214. This is accomplished upon energization of the solenoid 230 of valve 214. When this solenoid is energized, fluid under pressure is supplied from the pump 210 through the valve 214 to conduit 224. Once again, when the ram reaches its upper limit of movement, the pressure release valve 228 diverts the fluid flow away from the motors and to tank 264.

Referring now to FIGURE 17, there is illustrated the electrical circuit for controlling the electric motor M1 which drives the hydraulic pump 210 and the electrical motor M2 for vibrating the support table, as well as the electrical controls for the solenoids 230, 232 of solenoid valve 214. This control circuit includes a 440 volt power source 265 for supplying three phase 440 volt power through a start switch 266 to the motors M1 and M2. In addition to the start switch 266, power to the motors M1 and M2 is controlled by normally open contacts R1-2 and R2-2, respectively. Power to the control section of the control circuit is supplied from the 440 volt source through a transformer 267. This transformer converts the power from 440 volts to 24 volts between the leads 268 and 269.

A pump motor M1 control relay R1 is connected between the leads 268, 269 in series with a stop switch 270 and a start switch 271. A normally open holding relay R1-1 is connected in parallel with the start switch 271 and a lamp 272 is connected in parallel with the relay R1 to indicate when the relay is energized.

A vibrator motor control relay R2 is connected between the leads 268 and 268 in series with a stop switch 273 and a start switch 274. A normally open holding contact R2-1 of relay R2 is connected in parallel around the start switch 274 and an indicator lamp 275 is connected in parallel with the relay R2. Additionally, a normally closed contact TR-1 of timer relay TR is connected in series with sizing contacts 280, 282 attached to the bottoms of stops 240, 242 (see FIGURE 1) and contacts 284, 286 attached to the tops of stops 244, 246 of the frame. The contacts 280, 282 are insulated from the stop bars 240, 242 upon which they are mounted by strips of insulative material 290. The contact 286 is similarly insulated from the stop bar 246 upon which it is mounted by a strip of insulative material 292. The contact 284 is not, however, insulated from the stop bar 244 upon which it is mounted so that this contact 284 is in effect grounded to the frame of the machine. Power is supplied to the timer relay TR from a 440 volt source 294 through a transformer 296 which drops the voltage to 24 volts in the secondary winding 298 of the transformer 296.

The relay R3 which controls the solenoid 232 of valve 214 is connected between leads 268, 269 in series with a stop switch 300 and a normally closed down switch 301 as well as a normally open holding contact R3-1 of the relay. The relay R3 is also connected in series with the normally open contacts of up switch 302, the normally closed contacts of down switch 301 and the stop switch 300.

In a similar circuit, the down relay R4 is connected between leads 268, 269 in series with the normally open holding contact R4-1 and the normally closed contacts of up switch 302 and stop switch 300. A second circuit also connects the down relay R4 between the leads 268 and 269 through the normally open contacts of down switch 301, the normally closed contacts of up switch 302 and the stop switch 300.

The operation of the circuit is as follows. The start switch 266 is initially closed so as to complete a circuit to the primary winding of the transformer 267. The circuit to the pump motor M1 and vibrator motor M2 is however open at this time because the contacts R1-2 and R2-2 of these motors are open. The operator then closes the start switch 271 to the pump motor completing a circuit to the motor from lead 268 through stop switch 270 and start switch 271 via leads 310 and 312. Energization of the relays R1 closes the normally open holding contact R1-1 and thus completes a holding circuit through the stop switch 270 and lead 314 to the relay R1. Energization of the relay R1 also results in the closing of the contacts R1-2 so that the pump motor M1 is energized. Referring to FIGURE 16, it will be seen that this results in fluid being supplied to the valve 214. The fluid does not, however, pass the valve at this time since neither of the solenoids 230 or 232 of the valve 214 are energized. It simply passes to tank 264 through the bypass valve 228.

To start the vibrator motor, the operator pushes the vibrator motor start switch 274 completing a circuit to the relay R2 via the normally closed circuit TR-1, normally closed stop switch 273, start switch 274, and leads 316 and 318. Energization of the relay R2 closes the normally open holding contact R2-1 so that the relay R2 remains energized via a circuit through the contact TR-1, the stop switch 273, lead 320, contact R2-1 and lead 318. Energization of the relay R2 also closes the vibrator motor contacts R2-2 so that the vibrator motor is energized and remains energized so long as the relay R-2 remains energized.

In order to move the ram assembly 80 downwardly, the operator pushes the stripper-ram assembly down switch 301 so as to complete a circuit to the relay R3 via lead 324, stop switch 300, lead 326, the normally closed contacts of up switch 302, lead 328, the normally open contacts of down switch 301, and lead 330 to the relay R3. This results in energization of the holding contact R3-1 which completes a holding circuit to the relay R3 via leads 324, 326, 328, 332 and contact R3-1. Energization of the relay R3 also closes the normally open contact R3-2 (FIGURE 16) so as to complete a 24 volt circuit to the solenoid 232 of valve 214. This completes a fluid circuit to the upper ends of the stripper-ram assembly motors 31 so that the stripper-ram is forced downwardly until its stops 240, 242 engage the stops 244, 246 of the machine frame. When the stops of the ram and frame abut, the pump 210 continues to operate but the fluid is at this time bypassed through the pressure release valve 228 to tank 264 so that downward movement of the ram is thus stopped or limited. Simultaneously with the stopping of the downward movement of the ram or at a preset time thereafter, the vibrator motor M2 is de-energized. This occurs as a result of the closing of the contacts 280, 284 and 282, 286 of the stops. Upon closing of these contacts the circuit from the secondary winding 298 of the transformer 296 through the timer relay TR is completed via a lead 340 through a resistor 342 and lead 344, via normally open contacts 286, 282 of the stops, via a lead 346 between the contacts 282 and 280, through the normally open contact 280-284, to ground. After a preset time delay as determined by the timer relay TR, the normally closed contact TR-1 in the circuit to the vibrator relay R2 opens. This results in deenergization of the relay R2 so that the contacts R2–2 open to de-energize the vibrator motors M2. The particular time delay scheduled in the time delay relay TR is determined by the type of aggregate used in the concrete mix. Some aggregates require that the vibrator continue to vibrate and compact the mix for approximately 2 or 3 seconds after the rams 90 have reached their downward limit of travel. Other aggregates require no such time delay so that a conventional immediate response relay may be substituted for the time delay relay TR.

The stripper-ram assembly may be raised by pushing the ram up switch 302 so as to complete a circuit via lead 324, stop switch 300, the normally closed contacts of down switch 301, lead 350, through the normally open contacts of up switch 302, and lead 352 to relay R4. Energization of the relay R4 closes the normally open holding contact R4–1 so as to complete a holding circuit via lead 324, stop switch 300, the normally closed contacts of down switch 301, and leads 350, 354. Energization of the relay R4 also results in closing of the normally open contact R4–2 to the solenoid 230 (see FIGURE 16) of valve 214 with the result that fluid from the pump 210 is routed to the lower sides of the motors 31 so that the stripper-ram is lifted into its raised position.

OPERATION

A machine cycle is initiated by placing a pallet 43 upon the transverse pallet supports 36. The mold box 50 is then lowered by the hydraulic motors 60 so as to locate its open bottom surface in contact with the top surface of the pallet 43. Reinforcing rods 111 are then placed in the grooves 154 of the fingers 150, 152 on the reinforcing rods supports. After the rods have been placed in the rod holders, the finger actuating motor 156 is actuated so as to clamp the rods between the fingers 150, 146 and 152, 148, respectively. With the rods clamped in place, the hydraulic motor 118 is then actuated so as to pivot the shaft 112 about its axis through an arc of approximately 90° by moving the bell crank 116 downwardly. As shown in FIGURE 7, this locates the reinforcing rods within the mold box slightly above the location in which they are ultimately molded into the product.

Assuming that the feed drawer 162 is located in its rearwardmost position beneath the hopper 161 and that the hopper is full of an appropriate concrete mix, the feed drawer may be moved forwardly so as to push or transport the concrete mix between the vertical walls 174, 176 of the drawer to a position over the mold box 50. The concrete mass or mix may be composed of a standard hydrated mixture of coarse aggregate sand and pulverized Portland cement, the proportion of the ingredients being determined by the required physical character of the concrete casting. The mixture is combined or mixed prior to being inserted into the hopper 161 of the machine. This is done on some mixing equipment apart from the machine of this application. The mix is then poured into the hopper which distributes it throughout the length of the hopper by means of a feed screw 170. The feed screw is also operative to continuously agitate mix contained within the hopper so as to preclude its setting while it remains in the hopper.

As the open bottom of the feed drawer 162 is moved forwardly over the open top of the mold box 50, the concrete mix falls into the mold box so as to completely fill it. As the feed drawer moves forwardly or after it reaches the forward limit of its movement, the combination agitators and distributors 169 and 171 are actuated so as to insure that the mold box is completely filled by the loose concrete mix from the feed drawer. Since the mix falls from the front of the drawer 162, as the feed drawer moves forwardly over the mold, the rearwardmost agitator-distributor assembly 171 forces the mix forward from the rear of the drawer to insure that the front of the mold box 50 is filled. As indicated in FIGURE 8, the vibrating motor M2 is driven at this time so as to rotate the vibrator shaft 353 at a high speed of rotation. Vibrational movement of the pallet support causes vibrational movement of the pallet and mold box which results in the particles of the loose mixture settling downwardly into the mold box as a relatively dense mass which is reduced in volume and is substantially free of voids or cavities. The vibratory treatment forces the particles into intimate contact with the reinforcing rods and with the internal mold surfaces to create a fine surface texture. As indicated by the arrow 356 in FIGURE 8, the vibratory motion occurs during the filling of the mold box so that the concrete mix partially compacts or settles around the reinforcing rods within the mold box.

Vibratory movement of the pallet supports is then stopped and the rod support motor 156 actuated so as to open the fingers of the reinforcing rods supports 132. As indicated in FIGURE 10, the rod supports are then lifted so as to locate the arms 132 of the reinforcing rods supports in the vertical plane. Lifting of the rod supports from the mold box occurs as a result of upward movement of the piston 124 of hydraulic motor 118 moving the crank arm 116 upwardly so as to pivot the support arm carrying shaft 112 though an arc of approximately 90°.

The feed drawer is withdrawn after this initial vibrational treatment of the concrete mass and after opening of the reinforcing rod support fingers but before the rod supports are lifted from this mold box. As the feed drawer returns to beneath the hopper 161, the lower bar 204 of the front wall 176 of the feed drawer strikes off the top of the filled mold box 50.

If desired, the vibrator motor may be further actuated so as to complete the compaction of the concrete mass. After the vibrator unit has been activated for a sufficient period to compact the charge of concrete, the ramming cycle is initiated by the operator first pulling upon actuator bar 75 so as to release the safety latch lever 71 from the stripper ram 80. Thereafter, the proper switches are actuated so as to cause the motors 31 to move the combination stripper-ram to the lowered position of FIGURE 11 so as to engage the smooth bottom of the pads 92 with the upper surface of the partially compacted concrete mass in the mold box. The ram head exerts a downward pressure upon the concrete mass within the mold box to compress it further, bringing it to its final shape and size. As indicated by the arrow 358 of FIGURE 11, the vibrator motor is operated during the pressing or ramming cycle of the machine. The vibratory impulses greatly reduce the frictional resistance of the concrete particles and thereby facilitate their relative movement in response to the downward pressure imposed by the ram head. In actuality, most of the compaction occurs as a result of the vibratory motion of the pallet support. The ram operates primarily to size as well as finish the top surface of the concrete product contained within the mold box.

When the stops 240, 242 attached to the stripper-ram assembly 80 engage the stops 244, 246, respectively, of the machine frame, the control circuit heretofore described is operative to stop the vibratory motor automatically either immediately or after some predetermined time delay. Thus the final product produced upon the machine is always and consistently of the same size. If the vibration were to continue for some random or indeterminant time after the completion of the downward movement of the ram, the vibrational movement would result in further compaction of the concrete mass with the result that the product formed within the mold would be undersized. The automatic cutoff of the vibratory motor in response to the completion of the downward movement of the ram of course precludes the production of such an undersized product. Additionally, the fact that a circuit must be completed through positive stops of the ram before the vibratory motor control circuit is opened insures that both ends of the products are of the same height before the vibratory movement is stopped.

With the newly cast product firmly held against the pallet by pads 92, the operator may actuate fluid motor 60 to lift or strip the mold box 50 upwardly from the products, as illustrated in FIGURE 12. It will be noted that the inside dimensions of the mold box are slightly greater than the pads 92 for clearance between the two as the mold box is lifted upwardly. During this operation, the stationary pads 92 act as a stripper head, effectively resisting the upward force of the mold box as developed by friction between the mold box and the preformed products.

After the mold box has been raised to the position shown in FIGURE 12, the operator may then elevate the mold box as well as the ram-stripper assembly 80 to the fully elevated position of FIGURE 13. Thereafter, the pallet 43 with the pre-cast products resting thereon may be bodily removed from the machine by a fork lift 360 as indicated in FIGURE 14 and placed in a suitable storage area for the curing period. To accelerate curing or setting, the precast members may be subjected to steam curing as is conventional practice in the fabrication of pre-cast concrete products.

The primary advantage of the machine illustrated and described in this application is the improved concrete products which are derived from its use. Specifically, the machine is operative to produce elongated, reinforctd precast concrete products which have no inherent structural defects or weaknesses at the interface of the layers of concrete between which the rods have heretofore been sandwiched during manual placement of the rods. Furthermore, the reinforced concrete products produced on the machine are of a consistent size and density from top to bottom as a result of the combination ramming and vibrational movement during the finishing portion of the machine cycle.

While only a single embodiment of the inventive machine of this application has been illustrated and described herein, those skilled in the art to which this invention pertains will readily appreciate numerous changes and modifications which may be made without departing from the spirit of our invention. Therefore, we do not intend to be limited except by the scope of the appended claims.

Having described our invention, we claim:

1. A machine for forming pre-cast concrete structural members, comprising:
   a supporting frame,
   a relatively long, slender mold box having an open bottom and an open top, said box being mounted for vertical movement relative to said machine frame,
   a vibratable pallet support resiliently mounted upon said machine frame below said mold box,
   means for moving said mold box between a lowered position with the open bottom in contacting relation with a pallet on said pallet support and a raised position above and remote from said pallet support,
   a combination ramming head and stripper plate assembly on said frame above said mold box, said assembly being movable vertically relative to said frame, said assembly including a plate dimensioned to be received through the open top of said mold box,
   means for moving said plate between a lowered position within said mold box and a raised position above said mold box, the improvement which comprises:
   means including rod holders attached to and movable with said mold box for placing reinforcing rods in said mold box and holding said rods in place while said box is filled with concrete mix.

2. A machine for forming pre-cast concrete structural members, comprising:
   a supporting frame,
   a relatively long, slender mold box having an open bottom and an open top, said box being mounted for vertical movement relative to said machine frame,
   a vibratable pallet support resiliently mounted upon said machine frame below said mold box,
   means for moving said mold box between a lowered position with the open bottom in contacting relation with a pallet on said pallet support and a raised position above and remote from said pallet support,
   a combination ramming head and stripper plate assembly on said frame above said mold box, said assembly being movable vertically relative to said frame, said assembly including a plate dimensioned to be received through the open top of said mold box,
   means for moving said plate between a lowered position within said mold box and a raised position above said mold box, the improvement which comprises:
   pivotly mounted rod holder means attached to and movable with said mold box for placing reinforcing rods in said mold box and holding said rods in place while said box is filled with concrete mix, and
   means including a motor for pivoting said rod holders from a position in which reinforcing rods contained within said holders are located outside said mold box to a position in which the rods are located within the box and for then withdrawing said holders from said box after said holders have deposited said rods within said box.

3. A machine for forming pre-cast concrete structural members, comprising:
   a supporting frame,
   a relatively long, slender mold box having an open bottom and an open top, said box being mounted for vertical movement relative to said machine frame.
   a vibratable pallet support resiliently mounted upon said machine frame below said mold box,
   means for moving said mold box between a lowered position with the open bottom in contacting relation with a pallet on said pallet support and a raised position above and remote from said pallet support,
   a combination ramming head and stripper plate assembly on said frame above said mold box, said assembly being movable vertically relative to said frame, said assembly including a plate dimensioned to be received through the open top of said mold box,
   means for moving said plate between a lowered position within said mold box and a raised position above said mold box, the improvement which comprises:
   plural rod holders mounted upon said mold box and operable to place reinforcing rods in said mold box, each of said rod holders comprising an elongated body member attached at one end to a pivot shaft, said body member being movable through an arcuate path about said pivot shaft, at least one arcuate finger fixedly attached to the other end of said body member, an elongated actuating member slidably mounted upon said body member, at least one arcuate finger fixedly attached to said actuating member and adapted to cooperate with said finger of said body member so as to clamp reinforcing rods therebetween, the radius of curvature of said arcuate fingers being approximately equal to the length of the pivot arm between said fingers and said pivot shaft.

4. A machine for forming pre-cast concrete structural members, comprising:
   a supporting frame,
   a relatively long, slender mold box having an open bottom and an open top, said box being mounted for vertical movement relative to said machine frame,
   a vibratable pallet support resiliently mounted upon said machine frame below said mold box,
   means for vibrating said pallet support, means for moving said mold box between a lowered position with the open bottom in contacting relation with a pallet on said pallet support and a raised position above and remote from said pallet support, a combination ramming head and stripper plate assembly on said frame above said mold box, said assembly being movable vertically relative to said frame, said assembly including a plate dimensioned to be received through the open top of said mold box, means for moving said plate from a raised position above said mold box to a lowered position within said mold box, while said vibrating means is operative so as to compact mix contained within said mold box, the improvement which comprises:

means for stopping the vibrating means during the compaction of mix within said mold box in response to said combination ramming head and stripper plate reaching a predetermined height relative to said mold box, said last named means including a pair of series connected switching means located at opposite ends of said machine and operable to stop downward movement of said plate only when both of said switches have been operated.

5. A machine for forming pre-cast concrete structural members, comprising:

a supporting frame, a relatively long, slender mold box having an open bottom and an open top, said box being mounted for vertical movement relative to said machine frame, a vibratable pallet support resiliently mounted upon said machine frame below said mold box, means for vibrating said pallet support, means for moving said mold box between a lowered position with the open bottom in contacting relation with a pallet on said pallet support and a raised position above and remote from said pallet support, a combination ramming head and stripper plate assembly on said frame above said mold box, said assembly being movable vertically relative to said frame, said assembly including a plate dimensioned to be received through the open top of said mold box, means for moving said plate from a raised position above said mold box to a lowered position within said mold box, while said vibrating means is operative so as to compact mix contained within said mold box, the improvement which comprises:

means for stopping the vibrating means during the compaction of mix within said mold box in response to said combination ramming head and stripper plate reaching a predetermined height relative to said mold box, said last named means including a pair of stop bars attached to opposite ends of said machine and a pair of stop elements attached to opposite ends of said assembly, said stop elements being engageable wtih said stop bars when said plate reaches said predetermined height, and said stop elements and stop bars being electrically connected in series with said vibrating means.

6. The machine of claim 1 which further comprises a pair of hydraulic motor means for moving said plate vertically between a lowered position in which said plate is located within said mold box to a raised position in which said plate is located above said mold box, one of said pair of motor means being located adjacent each end of said elongated plate, a single pump for supplying fluid through conduit means to said pair of hydraulic motor means, and a flow divider in said conduit means for metering an equal amount of fluid from said pump to each of said hydraulic motor means so as to maintain the opposite ends of said plate in a common horizontal plane.

7. A machine for forming pre-cast concrete structural members, comprising:

a supporting frame, a relatively long, slender mold box having an open bottom and an open top, said box being mounted for vertical movement relative to said machine frame, a vibratable pallet support resiliently mounted upon said machine frame below said mold box, a combination ramming head and stripper plate assembly mounted on said frame above said mold box, said assembly being movable vertically relative to said frame, said assembly including a plate to be received through the open top of said mold box, a hopper fixedly attached to said frame for storing a concrete mix therein, a transversely movable feed drawer movable from beneath said hopper to a position over the open top of said mold box, reinforcing rod holders mounted uopn said mold box so as to be movable therewith and operable to place reinforcing rods in said mold box, means for moving said mold box downwardly so as to place the open bottom of said box in contacting relation with a pallet on said pallet support, means for moving said rod holders so as to locate reinforcing rods contained in said holders within said mold box, means for moving said feed drawer from a position beneath said hopper to a position over said mold box so as to transport concrete mix from said hopper to said mold box, means for vibrating said pallet support while said reinforcing rods are supported by said rod holders within said mold, means for withdrawing said rod holders from said mold box so as to leave said reinforcing rods suspended in the concrete mix within said mold box, means for moving said plate downwardly into said mold box while simultaneously vibrating said pallet support so as to compress concrete contained within said mold box, means for lifting said mold box while said plate is held stationary so as to strip a pre-cast concrete structural member from said mold box, and means for raising said plate out of engagement with the pre-cast concrete structural member so as to leave said structural member supported solely upon a pallet on said pallet support.

8. A machine for forming pre-cast concrete structural members, comprising:

a supporting frame, a relatively long, slender mold box having an open bottom and an open top, said box being mounted for vertical movement relative to said machine frame, a vibratable pallet support resiliently mounted upon said machine frame below said mold box, means for moving said mold box between a lowered position with the open bottom in contacting relation with a pallet on said pallet support and a raised position above and remote from said pallet support, a combination ramming head and stripper plate assembly on said frame above said mold box, said assembly being movable vertically relative to said frame, said assembly including a plate dimensioned to be received through the open top of said mold box, means for moving said plate between a lowered position within said mold box and a raised position above said mold box, means including rod holders mounted upon said mold box and movable therewith [attached to said machine] for placing reinforcing rods in said mold box and holding said rods in place while said box is filled with concrete mix, a hopper fixedly attached to said frame for storing a concrete mix therein, and a transversely movable feed drawer movable from beneath said hopper to a position over said mold box so as to transport concrete mix from said hopper to said mold box.

9. A machine for forming pre-cast concrete structural members, comprising:
- a supporting frame,
- a relatively long, slender mold box having an open bottom and an open top, said box being mounted for vertical movement relative to said machine frame,
- a vibratable pallet support resiliently mounted upon said machine frame below said mold box,
- means for moving said mold box between a lowered position with the open bottom in contacting relation with a pallet on said pallet support and a raised position above and remote from said pallet support.
- a combination ramming head and stripper plate assembly on said frame above said mold box, said assembly being movable vertically relative to said frame, said assembly including a plate dimensioned to be received through the open top of said mold box,
- means for moving said plate between a lowered position within said mold box and a raised position above said mold box,
- means including rod holders attached to and movable with said mold box for placing reinforcing rods in said mold box and holding said rods in place while said box is filled with concrete mix,
- a hopper fixedly attached to said frame for storing a concrete mix therein, and
- a transversely movable feed drawer movable from beneath said hopper to a position over said mold box so as to transport concrete mix from said hopper to said mold box.

10. A machine for forming pre-cast concrete structural members, comprising:
- a supporting frame,
- a relatively long, slender mold box having an open bottom and an open top, said box being mounted for vertical movement relative to said machine frame,
- a vibratable pallet support resiliently mounted upon said machine frame below said mold box,
- means for moving said mold box between a lowered position with the open bottom in contacting relation with a pallet on said pallet support and a raised position above and remote from said pallet support,
- a combination ramming head and stripper plate assembly on said frame above said mold box, said assembly being movable vertically relative to said frame, said assembly including a plate dimensioned to be received through the open top of said mold box,
- means for moving said plate between a lowered position within said mold box and a raised position above said mold box,
- means attached to said mold box and movable therewith [said machine] for placing reinforcing rods in said mold box and holding said rods in place while said box is filled with concrete mix,
- a hopper fixedly attached to said frame for storing a concrete mix therein, said hopper having a feed screw in the bottom thereof for distributing concrete mix throughout the length of said hopper,
- a transversely movable feed drawer movable forwardly from beneath said hopper to a position over said mold box so as to transport concrete mix from said hopper to said mold box, said drawer having concrete mix agitation means mounted in the rear thereof for agitating concrete mix while in said drawer and for moving said mix toward the front side of said drawer.

11. A machine for forming pre-cast concrete structural members, comprising:
- a supporting frame,
- a relatively long, slender mold box having an open bottom and an open top, said box being mounted for vertical movement relative to said machine frame,
- a vibratable pallet support below said mold box,
- resilient means connecting said pallet support to said machine frame, said resilient means including a relatively thick lamina of substantially non-metallic non-compressible, vibration dampening material and a relatively thin lamina of compressible resilient material,
- means for moving said mold box between a lowered position with the open bottom in contacting relation with a pallet on said pallet support and a raised position above and remote from said pallet support,
- a combination ramming head and stripper plate assembly on said frame above said mold box, said assembly being movable vertically relative to said frame, said assembly including a plate dimensioned to be received through the open top of said mold box,
- means for moving said plate between a lowered position within said mold box and a raised position above said mold box.

12. The machine of claim 11 wherein said vibration dampening material comprises a lamina of rubber bonded and impregnated fabric duck.

13. A machine for forming pre-cast concrete structural members, comprising:
- a supporting frame,
- a relatively long, slender mold box having an open bottom and an open top, said box being mounted for vertical movement relative to said machine frame,
- a vibratable pallet support below said mold box,
- resilient vibration dampening mounting means connecting said pallet support to said machine frame, said mounting means including a metal sleeve mounted between said support and said frame, a resilient core mounted within said sleeve and operative to prevent contact between said support and said sleeve,
- means for moving said mold box between a lowered position with the open bottom in contacting relation with a pallet on said pallet support and a raised position above and remote from said pallet support,
- a combination ramming head and stripper plate assembly on said frame above said mold box, said assembly being movable vertically relative to said frame, said assembly including a plate dimensioned to be received through the open top of said mold box,
- means for moving said plate between a lowered position within said mold box and a raised position above said mold box.

14. The machine of claim 13 wherein said core comprises at least two relatively thick laminae of substantially non-compressible, vibration dampening material between which is sandwiched a lamina of compressible resilient material.

References Cited

UNITED STATES PATENTS

| | | | |
|---|---|---|---|
| 2,400,631 | 5/1946 | Darden. | |
| 2,579,527 | 12/1951 | Weyerhaeuser | 18—30 XR |
| 2,732,607 | 1/1956 | Dodd | 25—118 XR |
| 2,831,230 | 4/1958 | Neth et al. | 25—84 XR |
| 2,839,810 | 6/1958 | Kovach | 25—103 |
| 2,965,948 | 12/1960 | Reckman et al. | 25—56 XR |
| 3,046,874 | 7/1962 | Dehn | 25—84 XR |
| 3,274,660 | 9/1966 | Mizer et al. | |

FOREIGN PATENTS

| | | |
|---|---|---|
| 681,730 | 3/1964 | Canada. |

J. SPENCER, OVERHOLSER, *Primary Examiner.*

ROBERT D. BALDWIN, *Assistant Examiner.*